United States Patent [19]

Satyanarayana et al.

[11] Patent Number: 5,327,228
[45] Date of Patent: Jul. 5, 1994

[54] SYSTEM FOR IMPROVING THE QUALITY OF TELEVISION PICTURES USING RULE BASED DYNAMIC CONTROL

[75] Inventors: Srinagesh Satyanarayana; Sandeep M. Dalal, both of Ossining, N.Y.

[73] Assignee: North American Philips Corporation, New York, N.Y.

[21] Appl. No.: 922,309

[22] Filed: Jul. 30, 1992

[51] Int. Cl.⁵ .............................................. H04N 9/64
[52] U.S. Cl. ................................. 348/647; 348/628
[58] Field of Search ................... 358/167, 37, 36, 166, 358/75, 27, 21 R; 382/14, 15; 364/513; 395/10, 3, 21, 118, 131; H04N 9/64

[56] References Cited

U.S. PATENT DOCUMENTS

| 4,823,184 | 4/1989 | Belmares-Sarabia et al. | 358/27 |
| 4,864,490 | 9/1989 | Nomoto et al. | |
| 4,866,645 | 9/1989 | Lish | |
| 4,918,620 | 4/1990 | Ulug | |
| 5,121,443 | 6/1992 | Tomlinson | 382/14 X |
| 5,161,014 | 11/1992 | Pearson et al. | 358/160 |
| 5,168,352 | 12/1992 | Naka et al. | 382/15 X |

OTHER PUBLICATIONS

"Neural Networks and Fuzzy Systems—A Dynamic Systems Approach to Machine Intelligence", Kosko.
"An Integrated One-Chip Processor for Color TV Receivers", Harwood, IEEE Trans. Consum. Electrron., vol. CE-23, pp. 300-310, Aug. 1997.
"A Chrominance Demodulator IC with Dynamic Flesh Correction", Harwood, IEEE Trans. Consum. Electron., vol. CE-22, pp. 111-117, Feb. 1976.
"An Introduction to Computing with Neural Nets", IEEE, ASSP Magazine Apr. 17, 1987.
"Analogue Circuits for Variable—Synapse Electronic Neural Networks", Tsividis & Satyanarayana, Electronic Letters, Nov. 19, 1987.
"Fuzzy Logic Flowers in Japan", Schwartz & Klir, IEEE, Spectrum, Jul. 1992.
Cubicalc Brochure, Hyperlogic © 1990.

Primary Examiner—Victor R. Kostak
Attorney, Agent, or Firm—Michael E. Marion

[57] ABSTRACT

A system and method for automatically improving the picture quality of television or other video based images, based upon picture content, using improved rule based picture analysis and compensation techniques. The distribution of facial and non-facial tones in a television picture are determined and used to control of picture color quality using neural network techniques. A preferred embodiment of the invention adjusts the brightness, contrast and color saturation of a displayed picture based upon selected portions of the received picture signal. These controls are adjusted every 1/60th of a second (i.e. at the end of each field) to provide an improved visual display. Analysis of the video signal in one field of a frame provides the information for adjusting the picture quality of the subsequent field of that frame.

20 Claims, 9 Drawing Sheets

FACIAL-TONE DETECTOR BOUNDARIES

76hc

SYSTEM FOR IMPROVING THE QUALITY OF TELEVISION PICTURES USING RULE BASED DYNAMIC CONTROL

BACKGROUND OF THE INVENTION

Television pictures are subject to variation in quality, for example color saturation and tint, due to less than ideal or inconsistent studio and production, signal processing and transmission conditions. These conditions are caused, for example, by improper lighting conditions, improper signal conditioning following recording, poor transmission, low quality signal demodulation in the receiver, or imperfect camera work.

Variation in picture quality can also be caused by improper picture settings at the receiver. Viewers can compensate for selected picture "imperfections" (i.e. in color, tint, brightness, contrast) using the receiver controls available to adjust these parameters. VIR reference signals transmitted along with the program signal can also be utilized by a properly equipped television receiver, to help adjust for transmission based inconsistencies in the picture. Unfortunately however, since the causes and degree of picture quality variation can change from program to program and scene to scene, the viewer usually has a choice of either putting up with the variations not correctable using VIR systems, or adjusting the receiver controls with each change in picture quality. In addition, VIR based systems require the broadcasters to agree to send the VIR signal and fail to address differences in the transmission medium or defects in the receiver.

The use of rule based "fuzzy logic" to control electronic apparatus has been described, for example, in U.S. Pat. No. 4,864,490, incorporated by reference herein. This patent describes a system for process control using predetermined reasoning rules. Computer software architecture for performing rule based reasoning and analysis is discussed in U.S. Pat. No. 4,918,620 which is also incorporated by reference herein. Such software is commercially available, for providing a decision system shell. Such a software package is commercially available under the name "CubiCalc".

The use of neural networks (nets) to simultaneously process information inputs in a non-linear system, to provide a solution, are well known in the information processing art. References describing such neural nets, their applications and implementation, include "An Introduction to Computing With Neural Nets", Lippmann, IEEE, ASSP Magazine, Apr. 7, 1987 and "Analogue Circuits for Variable-Synapse Electronic Neural Networks", Tsividis & Satyanarayana, Electronic Letters, Nov. 19, 1987", as well as U.S. Pat. No. 4,866,645, which are incorporated by reference herein.

The instant invention has as its object, to provide a system for automatically improving the picture quality of television or other video based images, based upon picture content, using improved rule based picture analysis and compensation techniques. The embodiments decribed herein can be implemented, for example in a VLSI chip to provide a cost effective and robust implementation (i.e. one not substantially effected by fabrication variations).

SUMMARY OF THE INVENTION

The invention comprises a system for analyzing the color distribution, and dynamic range and average value of the luminance. In one embodiment of the invention, the analysis made during a first field of a video image can be used to modify the parameters of a subsequent field.

One feature of one embodiment of the invention is that it utilizes neural networks and rule based techniques to analyse the color signals of the received images to control a color parameter (i.e. color saturation, tint, hue etc.) of a displayed picture.

Another feature of an embodiment of the invention is that it utilizes a "fuzzy logic" rule based system to adjust the brightness and contrast of a displayed picture.

Still another embodiment of the invention comprises a system for detecting facial and non-facial tones in a television picture and using them as a basis for analysis and control of picture color quality using neural network techniques.

A preferred embodiment of the invention comprises a system for use with, or as part of, a television receiver. The system adjusts the brightness, contrast and color saturation of a displayed picture based upon selected portions of the received picture signal. These controls are adjusted every 1/60th of a second (i.e. at the end of each field) to provide an optimal visual display. Analysis of the video signal in one field of a frame provides the information for adjusting the picture quality of the subsequent field of that frame.

These and other aspects of the invention will be apparent from and elucidated with reference to the embodiments described hereinafter. Although the system will be described herein in conjunction with an NTSC field rate (i.e. sixty times per second), it is to be understood that the invention contemplates operating with other types of television or video display systems or color image printers using different field (or frame) rates.

DETAILED DESCRIPTION OF PREFERRED EMBODIMENTS OF THE INVENTION

Figure 1:
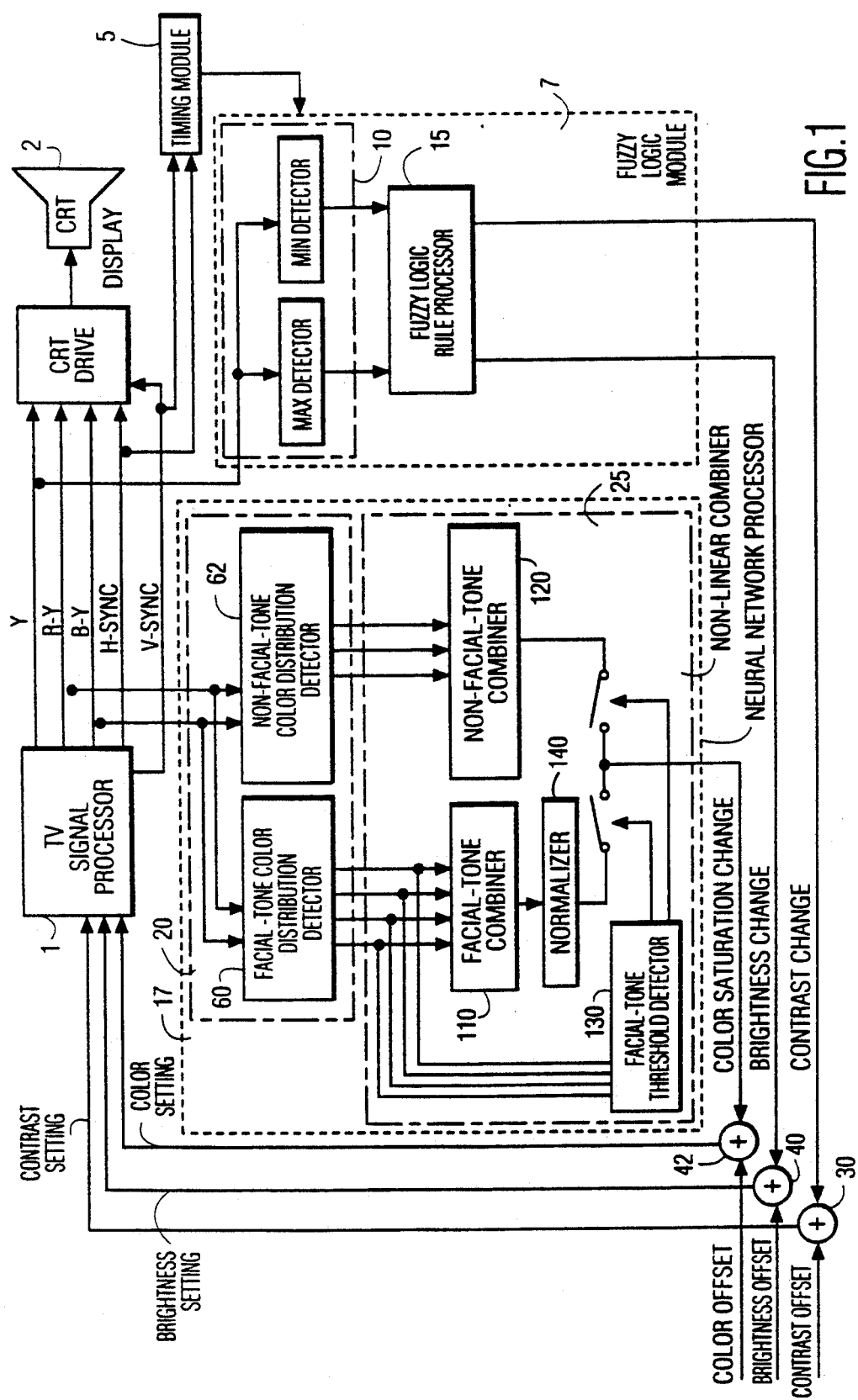
FIG. 1 is a block diagram of a picture enhancement system comprising a first embodiment of the invention.

FIG. 1 is a block diagram of a television receiver comprising one embodiment of the invention. A composite television signal comprising a luminance signal Y and color difference signals (R-Y) and (B-Y), is provided as an input to video signal processor 1 which separates the vertical and horizontal sync, luminance and color difference signals and provides them to the display device (i.e. CRT) 2. The luminance signal is also provided to the min/max detector circuit 10, which forms part of the fuzzy logic module 7, and the color difference signals are provided to color distribution detector circuit 20, which forms part of the neural network processor 17. The sync and luminance signals are provided to timing circuit 5, which derives therefrom the various timing signals commonly used within a receiver, as well as those necessary for use with the fuzzy logic module 7 and neural network processor 17. Integrated circuits which perform the functions of video processor circuit 1 are commonly used in color television receivers and are well known to those skilled in the art.

Picture quality control signals are provided by adders 42, 40 and 30 to T.V. signal processor 1. Adder 42 provides a color setting control signal to T.V. signal processor 1 which is used by the signal processor to control the gain of R-Y and B-Y signals provided by TV signal processor 1. The color setting control signal is derived by adding the color change signal from neural network processor 17 to a color offset signal. In similar fashion, adder 40 controls the Y signal provided by TV signal processor 1, by adding the brightness change signal from fuzzy logic rule processor 15 to a brightness offset signal, to form a brightness setting control signal which is provided to the signal processor. Adder 30 controls the gain of the Y signal provided by TV processor 1 by adding the contrast change signal from fuzzy logic rule processor 15 to a contrast offset signal to form a contrast setting control signal which is similarly provided to the signal processor.

Figure 2:
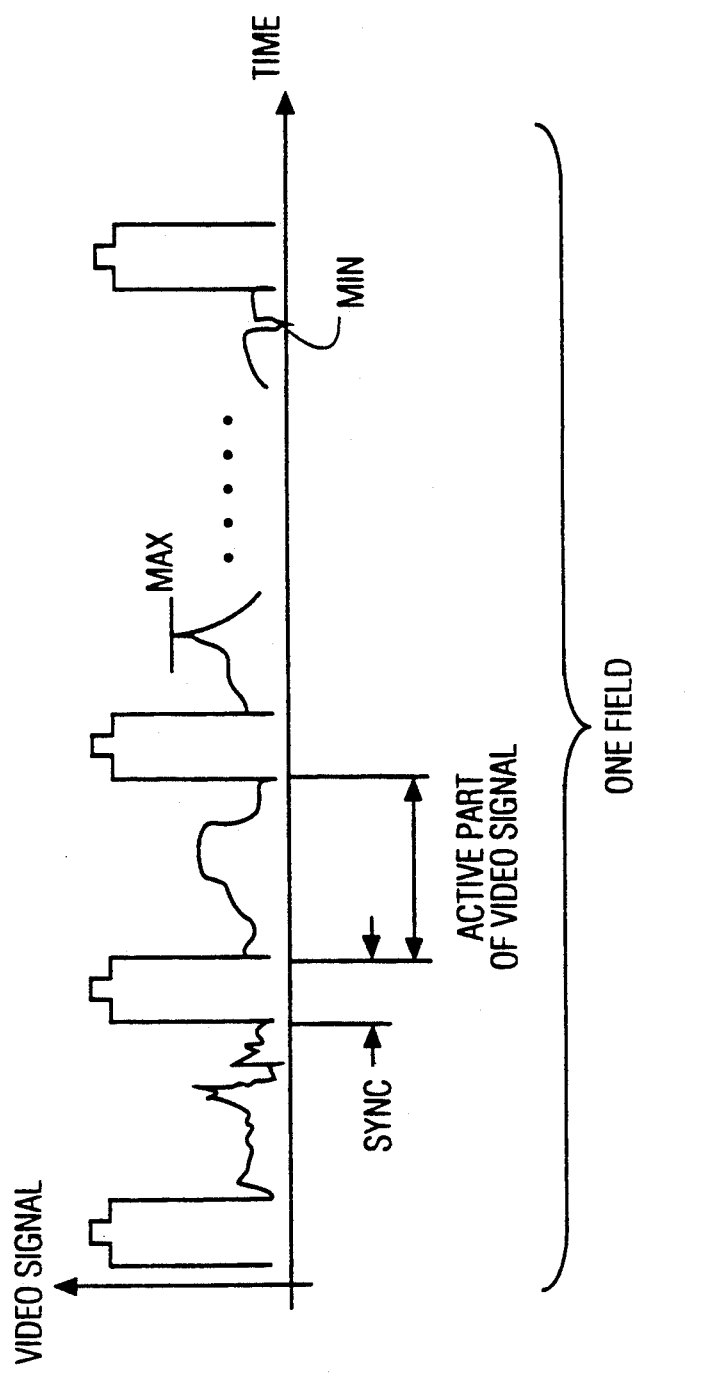
FIG. 2 describes graphically the minimum and maximum levels in one field of a video signal.

Fuzzy logic module 7 is used to implement a rule based system in which the relationship between its input and output takes the form of one or more IF... THEN rules. In such systems, the input variables are described in a linguistic way by means of membership functions, before the rules are applied. Min/max detector 10, samples the minimum (MIN) and maximum (MAX) values of the luminance signal once every field, as shown graphically in FIG. 2. The minimum and maximum values form the input parameters to fuzzy rule processor 15.

As described in the references incorporated herein, a rule based system utilizing fuzzy logic represents a range of input values using a "fuzzy subset" of linguistic values which are each described by a membership function. A brief introduction to the use of such membership functions for fuzzy logic control is presented in the IEEE Spectrum, pp. 32-35, July, 1992, which is incorporated by reference herein. Fuzzy rule processor 15 implements a number of membership functions which each provide respective output values in a continuous range between 0 and +1 for respective input values (either MIN or MAX) of the luminance signal discussed above.

Figure 3:
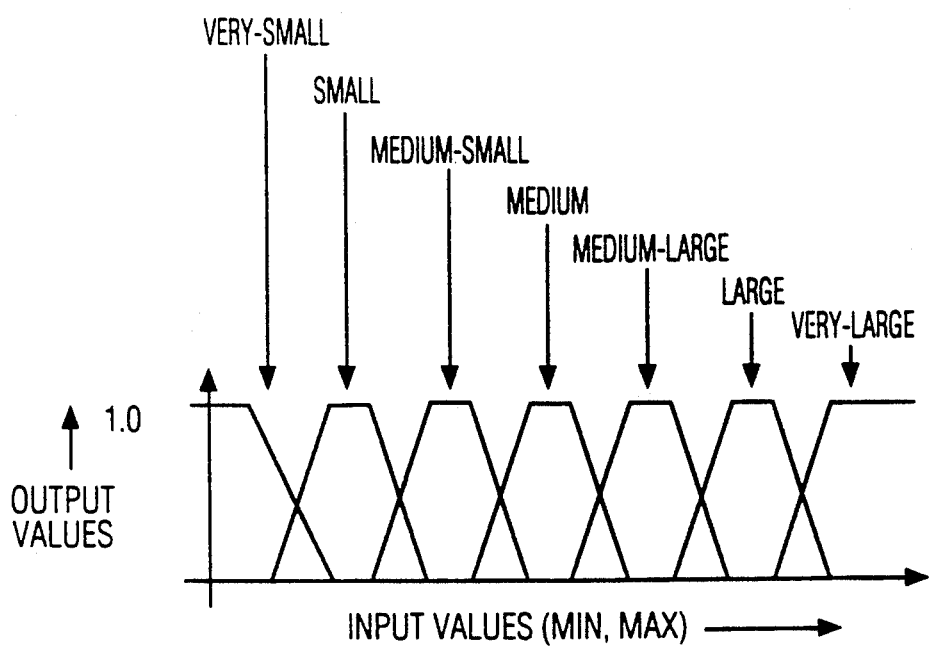
FIG. 3 graphically illustrates a number of membership functions.

The fuzzy rule processor 15 implements a set of rules each of which are characterized by a pair of membership functions. The various membership functions used are shown in FIG. 3. The task of the fuzzy rule processor 15 is to generate a brightness change value and a contrast change value for a given pair of inputs namely MIN and MAX. For each pair of inputs, the fuzzy rule processor 15 evaluates the contribution of each rule to the contrast change and brightness change according to standard procedures well known in the art of fuzzy logic rule design (as described in the references incorporated herein). The resulting contrast and brightness change values can be either positive or negative.

The resulting contrast change value I from the fuzzy rule processor 15 is combined in adder 40 to a preset contrast offset value resulting in the contrast setting signal of the video signal processor 1. Similarly, the resulting brightness change value J from fuzzy rule processor 15 is combined in adder 42 to a preset brightness offset value resulting in the brightness setting signal of the video signal processor 1.

It is to be understood that rules can be formulated for each given MIN/MAX combination which can provide for an increment, a decrement, or no change in I and/or J, and the formulation of the number of rules, as well their corresponding adjustments (I and/or J) must be established according to the standards and results expected by the designer in response to different MIN/MAX combinations. In addition, further rules can be implemented to correspond to combinations of MAX, MIN and AVERAGE values of luminance over a field or group of fields. Such AVERAGE values could be measured by using an AVERAGE value detector as part of the min/max detector detector 10 in which the average luminance value over a single field or group of fields can be measured. Such rule definitions are thus subjective and once determined can be implemented without undue experimentation by those skilled in the relevant art using, for example, commercially available software packages such as "CubiCalc", manufactured by HyperLogic Corp., Escondido, Calif. or using simple programs in C.

Appendix I is a source code listing providing an example for deriving outputs for each of a number of rules as described above. Techniques for formulating and implementing rules for use in such rule based systems, as implemented in fuzzy logic processor 15, are further explained in the text book "Neural Networks and Fuzzy Systems" by Bart Kosko, Prentice Hall, pp. 29-34 for example, which is incorporated by reference herein.

The color saturation level of a television display determines how vivid the colors look. A displayed picture may have too little, or too much color, and the invention comprises means for automatically adjusting the color saturation (or other color parameter such as tint or hue) to provide the best picture (color) quality. Although the embodiments described herein describe the control of color saturation, it is to be understood that similar techniques can be used to control other color parameters as well.

Because the human eye is particularly sensitive to facial tones (i.e. flesh tones corresponding to the human face), control of the colors comprising these facial tones must be subtle. The instant invention therefore utilizes the relative balance between facial and non-facial tones in a picture as a basis for providing color parameter control.

As shown in FIG. 1, video signal processor 1 provides color difference signals (R-Y) and (B-Y) to the CRT 2 and also to neural network processor 17. Neural network processor 17 comprises a color distribution detector 20, which comprises two neural networks, one for measuring facial tones in the displayed image, and one for measuring the non-facial tones.

Figure 4:
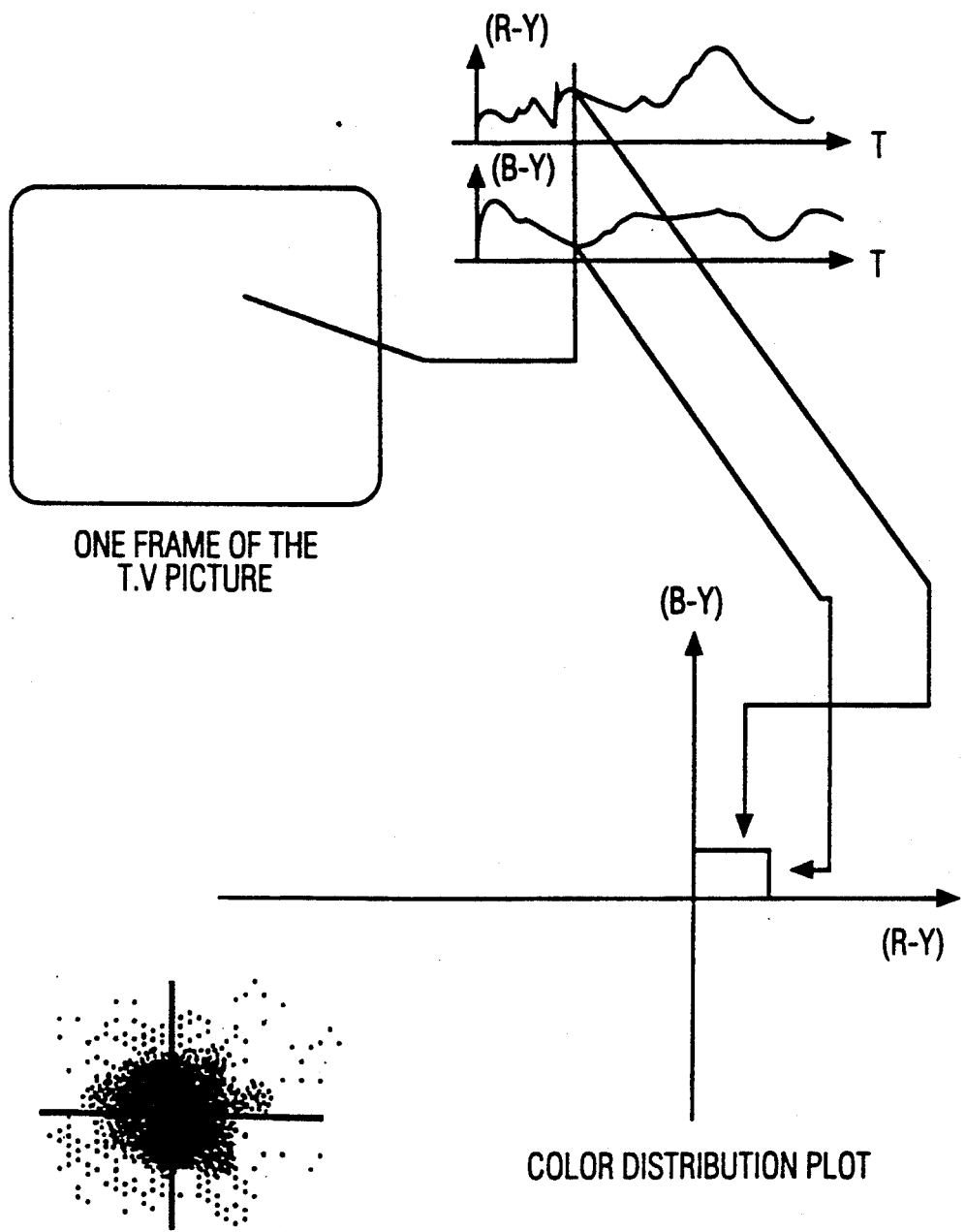
FIG. 4 describes graphically, the plotting of a color distribution plot.

As illustrated in FIG. 4, the color distribution detector 20 functions to evaluate in which regions of the two-dimensional color difference signal plane, the picture in a particular field lies in, as described in more detail below.

Figure 5:
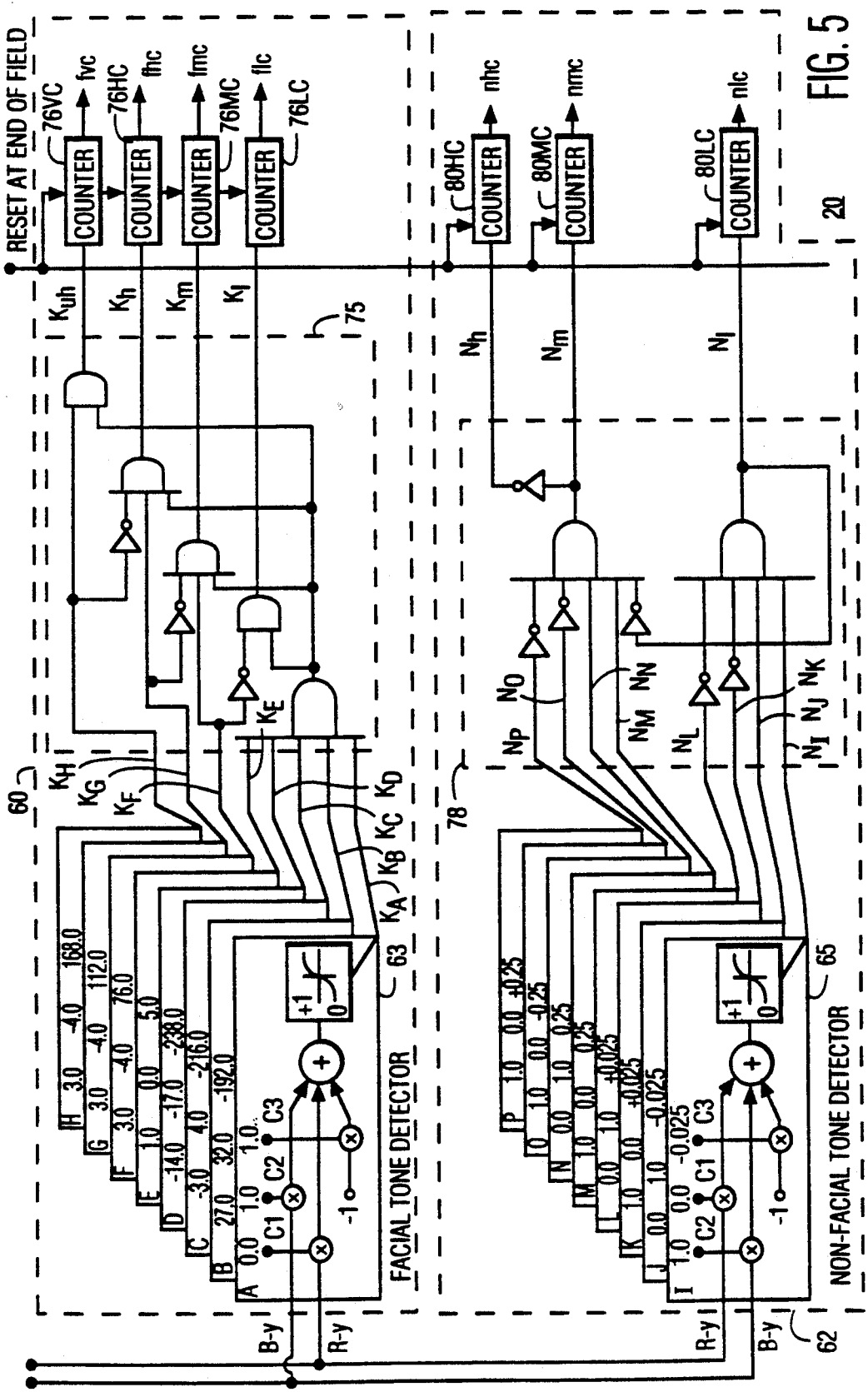
FIG. 5 describes one embodiment of a color distribution detector.

FIG. 5 provides a detailed description of an embodiment of color distribution detector 20 which comprises a facial tone detector 60 and a non-facial tone detector 62, and which analyzes the color difference signals of each pixel in order to map the position of each pixel on the two dimensional color distribution plot as shown in FIG. 4.

Figure 6:
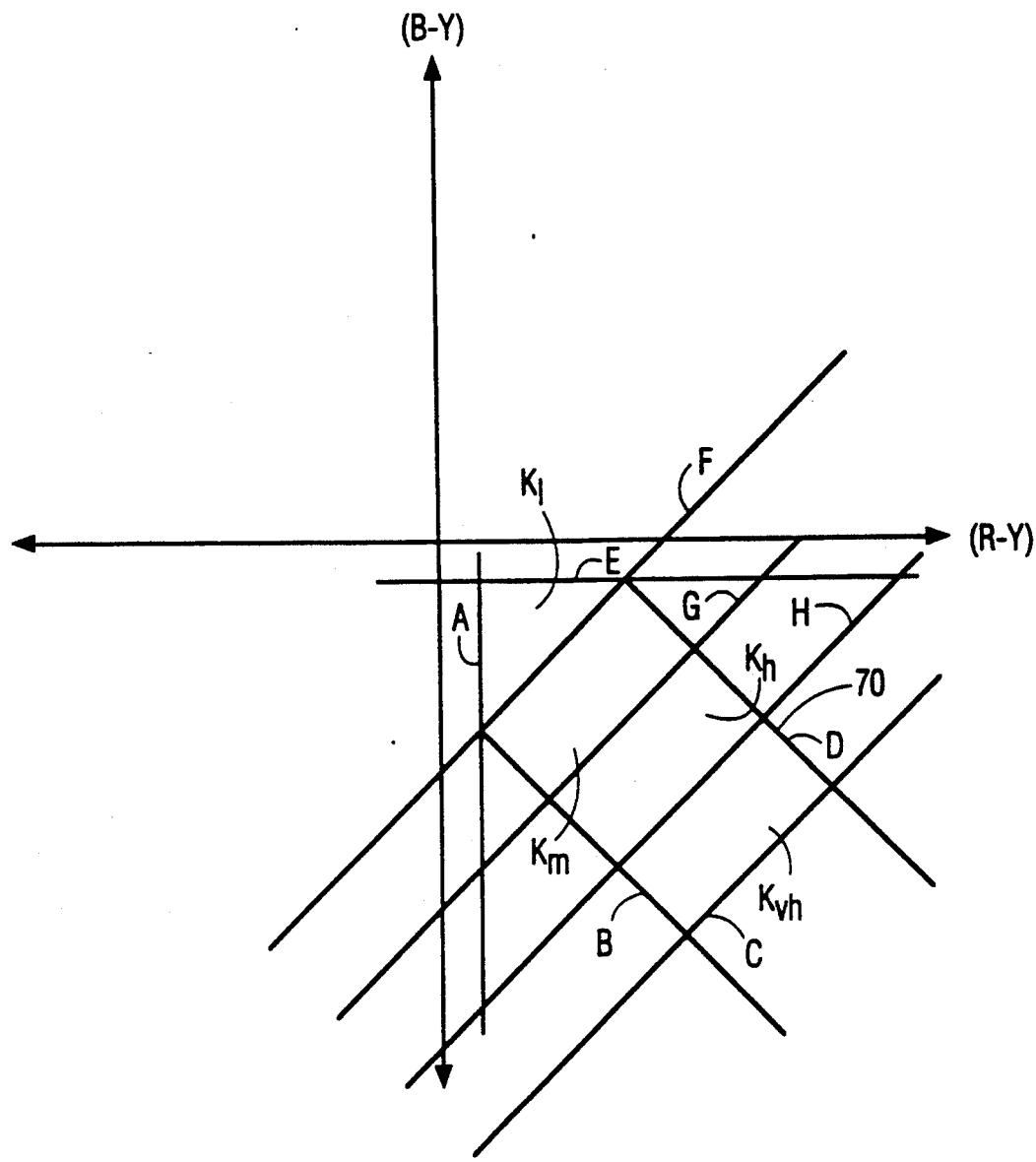
FIG. 6 describes graphically, the facial tone areas of the color distribution.

FIG. 6 describes a color distribution axis showing an area 70 which represents that portion of the color distribution comprising facial tones. This area of the color distribution plot can be further divided into sections defined by lines A through H.

Facial tone detector 60 comprises eight neural networks each of which (63A to 63H) corresponds to one of the lines of the facial tone color distribution plot. Each line is defined by the equation: $(R-Y)c_1+(B-Y)c_2=c_3$. Each line forms a decision boundary. The eight lines form four distinct regions which are classified very high ($K_{vh}$), high ($K_h$), medium ($K_m$) and low ($K_l$). Neural networks 63A through 63H each have a structure as shown in detail for 63A. They differ, however, in the values given to the multipliers $c_1$, $c_2$ and $c_3$.

Each neural net defines a decision boundary and the sign of the output of each neural net determines which side of that particular decision boundary a given point in the color distribution plot lies. The slope and position of each line is determined by fixing the various weights provided to the respective multipliers c1, c2 and c3. The outputs of each of the multipliers are combined in respective adders to give the final decision of each neural net. The output of each adder is passed through a respective sigmoid function block, for example $x=0.5(\tanh(u+1)$, where u is the output of the respective adder, which normalizes the output of the adder to be either +1 or 0. For example, if the color signals fall on one side of the line defined by respective neural net, the output of the neural net is +1. If the point lies on the other side of the line defined, then the output of the network is 0. Each multiplier of each neural network determines one side of a particular region.

The output of each of the neural networks 63A through 63H, yielding outputs $K_A$ through $K_H$ respectively, are combined through logic network 75 which reduces the eight inputs to outputs corresponding to regions $K_{vh}$, $K_h$, $K_m$ and $K_l$ within the facial tone area of the color plot.

Each of these outputs is either 0, if the plotted point lies outside of the respective region, or 1 if the point lies inside the respective region. Each of these outputs are fed to a respective counter and the result is that each pixel with a "very high" ($k_{vh}$) color saturation is counted in counter 76vc, each pixel with a "high⇌ ($K_h$) saturation is counted in counter 76hc, each pixel with a "medium" ($K_m$) color saturation is counted in counter 76mc and each pixel with a "low" ($K_l$) color saturation is counted in counter 76lc.

Figure 7:
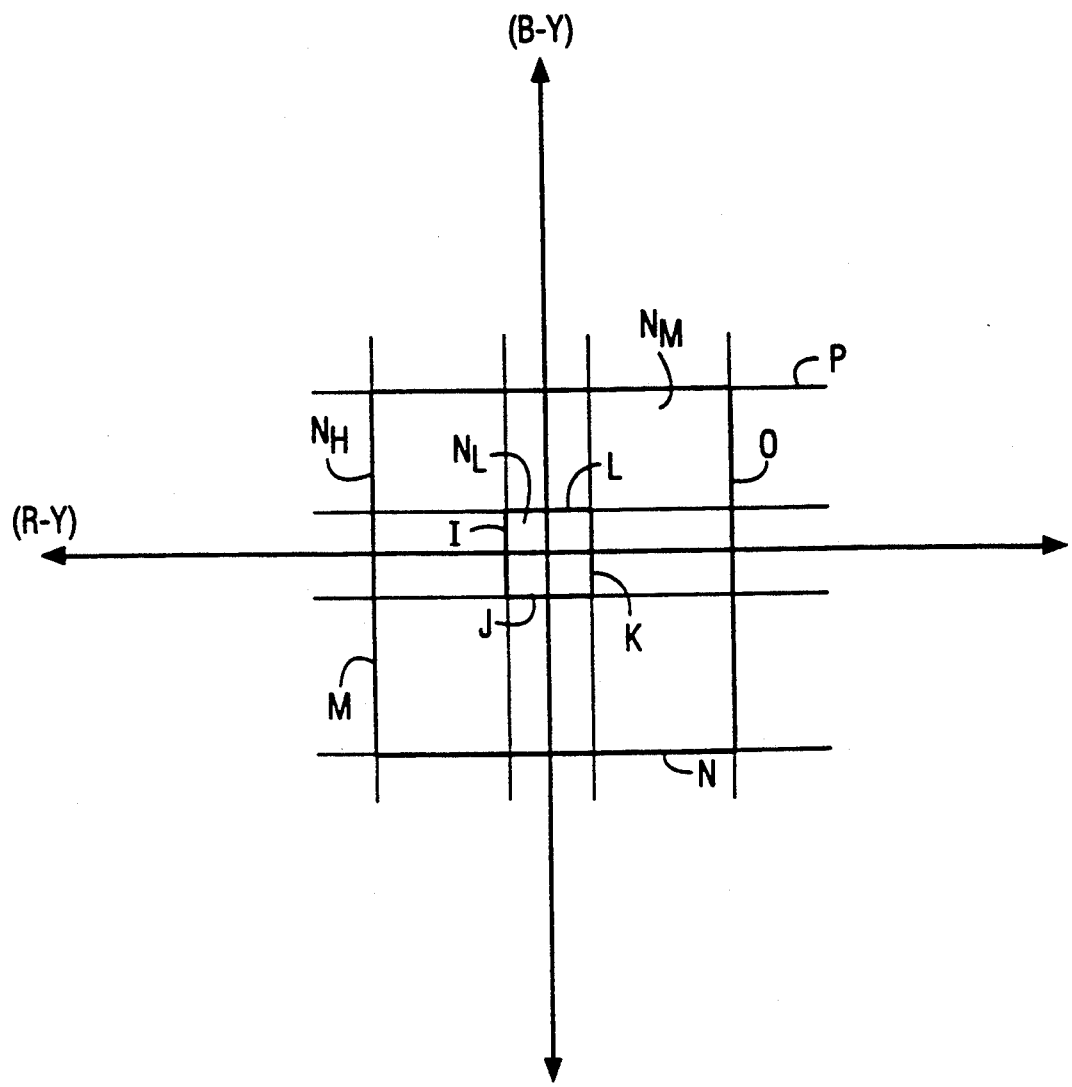
FIG. 7 describes graphically, the non-facial tone areas of the color distribution.

In a similar fashion, the non-facial tone detector 65 comprising neural networks 65I through 65P detect the occurrence of color signals in the color distribution plot outside of the non-facial tone area. The non-facial tone area is shown graphically in FIG. 7. The eight possible outputs from the non-facial neural networks are combined in logic network 78 to yield three separate categories of outputs $N_H$, $N_M$ and $N_L$ corresponding to "high" saturation, "medium" saturation and "low" saturation respectively. These outputs are fed to respective counters $80_{hc}$, $80_{mc}$ and $80_{lc}$ to provide respective values for high saturation, medium saturation and low saturation for color signals falling in the non-facial tone area of the color plot. The counts are made in counters $76_{vc}$, $76_{hc}$, $76_{mc}$, $76_{lc}$ and $80_{hc}$, $80_{mc}$, $80_{lc}$, for each field, by scanning each pixel within that field and establishing a total count in each counter for the field and then resetting the counters to zero and beginning again at the beginning of the next field. The counts established for a first field are then used by the non-linear combiner circuit 25 to generate the appropriate color change signal.

Figure 8:
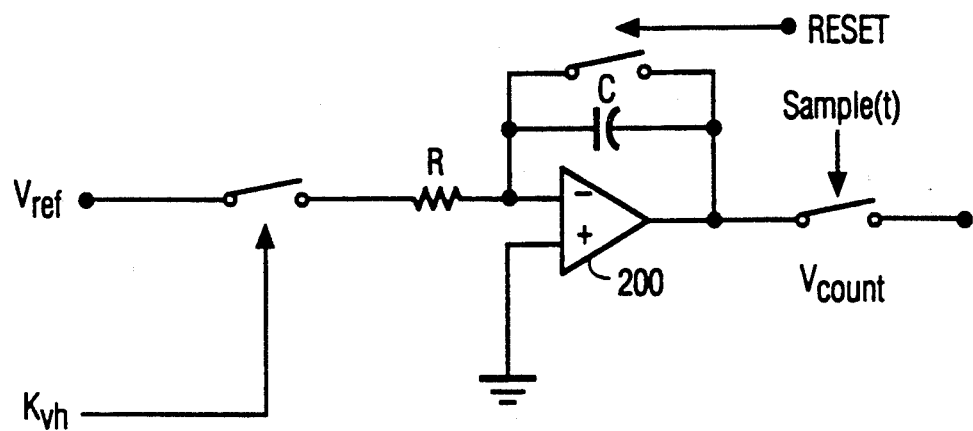
FIG. 8 describes one embodiment of a counter.

The counters in both the facial and non-facial tone detectors can be built using analog circuits, as shown in FIG. 8 for example. Digital counters could also be used.

As shown in FIG. 8, the integrator circuit 200 integrates a reference voltage, Vref, each time an appropriate count (for example $K_{vh}$ for counter $76_{vc}$) is high (+1), during a particular sampling interval t (for example one field). A total count voltage for each counter is provided for each category according to the formula Vcount = $-1/RC$ Vref(t). For counters $76_{vc}$, $76_{hc}$, $76_{mc}$ and $76_{lc}$ respectively, each Vcount equals fvc, fhc, fmc and flc. For counters $80_{hc}$, $80_{mc}$ and $80_{lc}$ respectively, the Vcount equals nhc, nmc and nlc. A RESET signal generated at the end of each field resets each respective counter.

The values of Vref, R and C are selected so that a maximum facial tone count (Kvhmax) yields a value of, for example, fvc=about +5 volts when all pixels of a field lie in the very high facial tone category $K_{vh}$.

Figure 9:
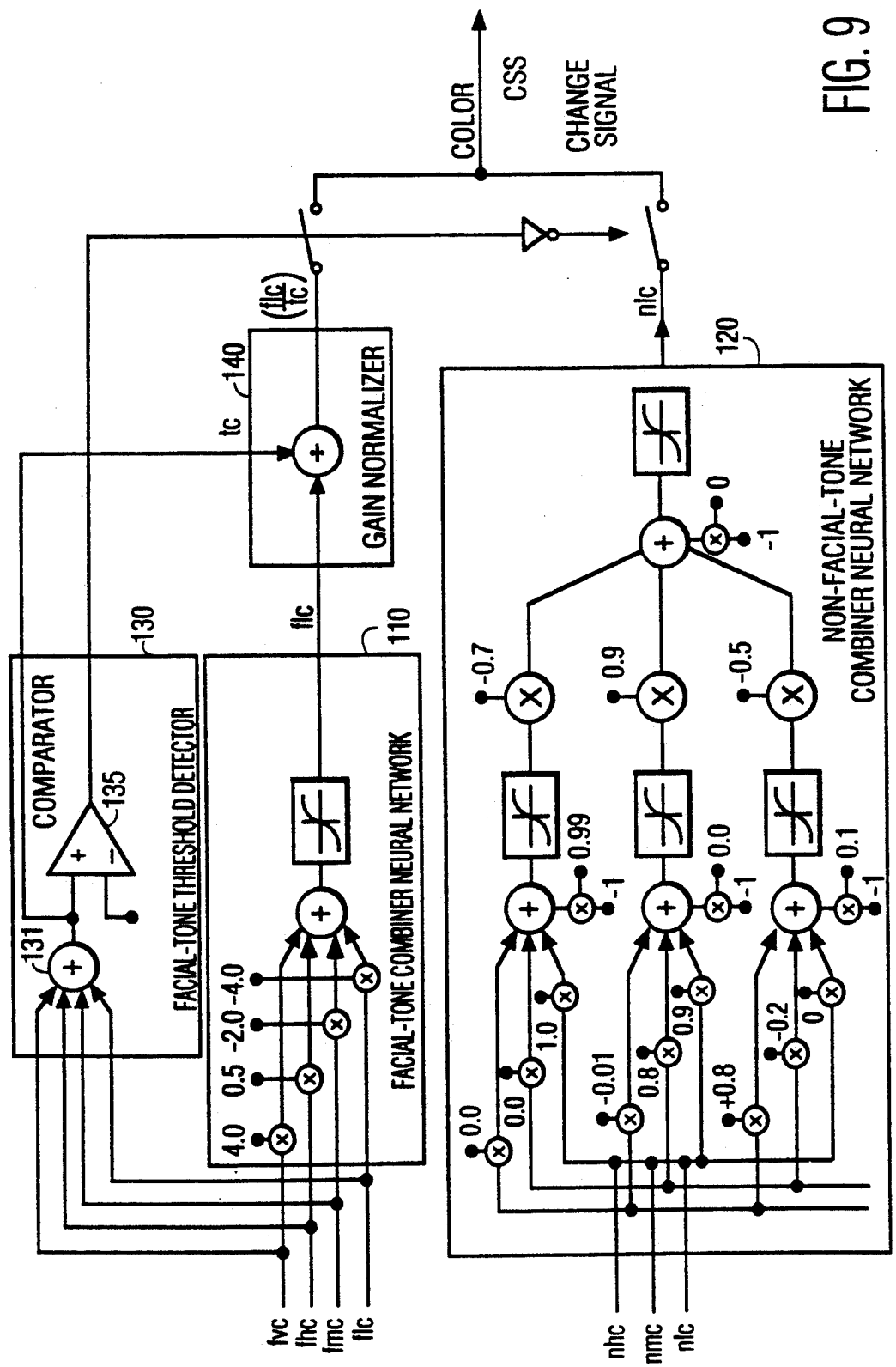
FIG. 9 describes one embodiment of non-linear combiners for the facial and non-facial tones and the normalizer for the facial tone non-linear combiner.

FIG. 9 describes in detail one embodiment of non-linear combiner 25 which comprises a neural network based facial tone combiner 110, a neural network based non-facial tone combiner 120 and a facial tone threshold detector 130. The various weights provided to the respective multipliers of the facial tone combiner neural network 110 and the non-facial tone combiner neural network 120, provide respectively a first color change signal, fsc, based upon the presence of facial tones, and a second color change signal, nsc, based upon the presence of non-facial tones.

Threshold detector 130 selects which of the color change signals should be selected as the output color change signal, CCS. Comparator 135, has as one input a facial tone threshold voltage, and as a second input the sum of the facial tone counts, fvc, fhc, fmc, and flc as combined in adder 137.

As discussed above in connection with the various multiplier coefficients chosen for use in the fuzzy logic module 7 and neural network processor 17, the values for the multiplier weights for combiner neural networks 110 and 120, and the color facial threshold voltage must be chosen by the designer according to the results desired. In a preferred embodiment, this threshold voltage could be equivalent to 20% of the Kvhmax, or about 1V which would correspond to a requirement that a picture have at least 20% of its pixels in the facial tone region 70 (FIG. 6) to be classified as a facial tone picture. The output of threshold detector 130 controls the selection of either the fsc or the nsc to be provided as the color change signal (CSS), to adder 30. Appendix II provides a source code listing comprising an embodiment of the invention which is used in conjunction with the neural network processor 17.

A normalizer 140 is used in conjunction with facial tone combiner 110 to adjust ("normalize") the value of fsc with respect to the total facial tone count tc from adder 137. This is necessary because the counts fvh, fhc, flc and fmc which are input to facial tone combiner 110 include only those pixels that belong to region 70. In order to prevent the total facial tone count tc from affecting the color saturation change fsc, fsc is therefore divided by tc in normalizer 140.

In a preferred mode of operation, the luminance and color signals appearing during active period of the first (odd) field of a television frame are detected and analyzed as described above and while the field is being displayed. During the vertical blanking interval, the rule processing and change value computation described above takes place. The picture control changes are applied to the video signal processor in order to modify the picture display of the subsequent (even) field of the frame.

Although the invention has been disclosed in particular embodiments herein, many variations and modifications may be made within the scope of the appended claims.

*Appendix I*

```
/*-----------------------------------------------------------*/
compute_max ()
{
 int i,j,i1,i2;
 int max;
 int count;

struct HEADER1 *header1;
 printf(" Computing the max \n");
 max = 0;
 count = 0;
 header1 = hp1;
 for(i=1; i<= (header1->lines_per_frame); i++)
    {
       for (j=1; j<= (header1->pels_per_line); j++)
          {
             if( max < lumout[i][j] ) {      max = lumout[i][j]; }
             if( lumout[i][j] > 244 ) ( count = count + 1; }
          }
    }
 printf(" Number of pixels having luminance > 234 = %d\n",count);
 return max;
}
/*-----------------------------------------------------------*/
compute_min ()
{
 int i,j,i1,i2;
 int min;
 int count;

struct HEADER1 *header1;
 printf(" Computing the min \n");
 min = 255;
 count = 0;
 header1 = hp1;
 for(i=1; i<= (header1->lines_per_frame); i++)
    {
       for (j=1; j<= (header1->pels_per_line); j++)
          {
             if( min > lumout[i][j] ) {      min = lumout[i][j]; }
             if( lumout[i][j] < 14 ) ( count = count + 1; }
          }
    }
 printf(" Number of pixels having luminance < 24 = %d\n",count);
 return min;
}
/*-----------------------------------------------------------*/
execute_all_rules (max,min)

int max,min;

{
  float rop1,rop2,rop3,rop4,rop5,rop6,rop7,rop8,rop9,rop10,rop11,rop12,rop13;
  float brit,con;

printf(" Executing the 'THEN' part of the rule \n");

rop1 = RULE_1 (max,min);
         rop2 = RULE_2 (max,min);
         rop3 = RULE_3 (max,min);
         rop4 = RULE_4 (max,min);
         rop5 = RULE_5 (max,min);
         rop6 = RULE_6 (max,min);
         rop7 = RULE_7 (max,min);
         rop8 = RULE_8 (max,min);
```

```
        rop9 = RULE_9  (max,min);
        rop10 = RULE_10 (max,min);
        rop11 = RULE_11 (max,min);
        rop12 = RULE_12 (max,min);
        rop13 = RULE_13 (max,min);

brit =-0.5*rop1 + 1.0*rop2 + 3.0*rop3 + 6.0*rop4 + 1.0*rop5 +   0*rop6 +
             -3.0*rop7 + -0.5*rop8 + -3.0*rop9 + -1.0*rop10 + 1.0*rop11 +
                0.0*rop12 + -1.0*rop13;

con = -3.0*rop1 + 0.0*rop2 + 1.0*rop3 + 5.0*rop4 + 1.0*rop5 + 0.0*rop6 +
             -1.0*rop7 + 0.5*rop8 +  -1.0*rop9  + 1.0*rop10 + 1.0*rop11 +
                3.0*rop12 + 2.0*rop13;

printf(" brit =%f  con=%f  \n ", brit,con);
    CONTRAST_BRIGHTNESS_CHANGE(brit,con);
}
/*-----------------------------------------------------------*/
 enhance ()
{
float rop1,rop2,rop3,rop4,rop5,rop6,rop7,rop8,rop9,rop10,rop11,rop12,rop13;
float maxop;
int rule_num;
int max,min;

compute_luminance ();

low_pass_filter ();

max = compute_max ();
min = compute_min ();

printf(" max = %d   min = %d \n ",max,min);

printf(" Executing the 'IF' part of the rules \n");

rop1 = RULE_1 (max,min);
rop2 = RULE_2 (max,min);
rop3 = RULE_3 (max,min);
rop4 = RULE_4 (max,min);
rop5 = RULE_5 (max,min);
rop6 = RULE_6 (max,min);
rop7 = RULE_7 (max,min);
rop8 = RULE_8 (max,min);
rop9 = RULE_9 (max,min);
rop10 = RULE_10 (max,min);
rop11 = RULE_11 (max,min);
rop12 = RULE_12 (max,min);
rop13 = RULE_13 (max,min);

printf("%4.2f %4.2f %4.2f %4.2f %4.2f %4.2f %4.2f %4.2f %4.2f %4.2f %4.2f %4.2f %4.

execute_all_rules (max,min);

compute_luminance ();

low_pass_filter ();

max = compute_max ();
min = compute_min ();
printf(" max = %d   min = %d \n ",max,min);
}
/*-----------------------------------------------------------*/
float VERY_LARGE (val)
int val;
{
  float mu;
  mu = 0.0;

if( (val > 200) && (val <= 256) ) {  mu = (val - 200)/56.0 ;}
  return mu;
 }
/*-----------------------------------------------------------*/
float LARGE (val)
int val;
{
  float mu;
  mu = 0.0;
```

```
  if( (val > 190) && (val <= 205) ) {  mu = (val - 190)/15.0 ;}
  if( (val > 205) && (val <= 256) ) {  mu = (256 - val)/50.0 ;} return mu;
  }
/*------------------------------------------------------------*/
float MEDIUM_LARGE (val)
int val;
{
  float mu;
  mu = 0.0;

if( (val > 150) && (val <= 190) ) {  mu = (val - 150)/30.0 ;}
  if( (val > 190) && (val <= 220) ) {  mu = (220 - val)/30.0 ;} return mu;
  }
/*------------------------------------------------------------*/
float MEDIUM (val)
int val;
{
  float mu;
  mu = 0.0;

if( (val > 90) && (val <= 127) ) {  mu = (val - 90)/30.0 ;}
  if( (val > 127) && (val <= 150) ) {  mu = (150 - val)/30.0 ;} return mu;
  }
/*------------------------------------------------------------*/
float MEDIUM_SMALL (val)
int val;
{
  float mu;
  mu = 0.0;

if( (val > 30) && (val <= 60) ) {  mu = (val - 30)/30.0 ;}
  if( (val > 60) && (val <= 90) ) {  mu = (90 - val)/30.0 ;} return mu;
  }
/*------------------------------------------------------------*/
float SMALL (val)
int val;
{
  float mu;

mu = 0.0;
  if( (val > 0) && (val <= 45) ) {mu = (val - 0.0)/46.0 ;} if( (val > 45) && (val <= 60) ) {mu = (60.0 - val)/16.0 ;}
  return mu;
  }
/*------------------------------------------------------------*/
float VERY_SMALL (val)
int val;
{
  float mu;

mu = 0.0;
  if( (val > -1) && (val <= 45) ) {mu = (45.0 - val)/46.0 ;}
  return mu;
  }
/*------------------------------------------------------------*/
/*              CONDTION PART OF THE RULE ("if")         */
/*------------------------------------------------------------*/
float RULE_1 (max,min)
int max,min;
{
  float mu_max, mu_min, smaller_mu;

mu_max = VERY_LARGE(max);
mu_min = VERY_SMALL(min);
smaller_mu = mu_max;
if( mu_max > mu_min ) {smaller_mu = mu_min;}
return smaller_mu;
}
/*------------------------------------------------------------*/
```

```
float RULE_2 (max,min)
int max,min;
{
   float mu_max, mu_min, smaller_mu;

mu_max = LARGE(max);
mu_min = VERY_SMALL(min);
smaller_mu = mu_max;
if( mu_max > mu_min ) {smaller_mu = mu_min;}
return smaller_mu;
}
/*-----------------------------------------------------------*/
float RULE_3 (max,min)
int max,min;
{
   float mu_max, mu_min, smaller_mu;

mu_max = MEDIUM_LARGE(max);
mu_min = VERY_SMALL(min);
smaller_mu = mu_max;
if( mu_max > mu_min ) {smaller_mu = mu_min;}
return smaller_mu;
}
/*-----------------------------------------------------------*/
float RULE_4 (max,min)
int max,min;
{
   float mu_max, mu_min, smaller_mu;

mu_max = MEDIUM(max);
mu_min = VERY_SMALL(min);
smaller_mu = mu_max;
if( mu_max > mu_min ) {smaller_mu = mu_min;}
return smaller_mu;
}
/*-----------------------------------------------------------*/
float RULE_5 (max,min)
int max,min;
{
   float mu_max, mu_min, smaller_mu;

mu_max = MEDIUM_LARGE(max);
mu_min = SMALL(min);
smaller_mu = mu_max;
if( mu_max > mu_min ) {smaller_mu = mu_min;}
smaller_mu = 0.0;
return smaller_mu;
}
/*-----------------------------------------------------------*/
float RULE_6 (max,min)
int max,min;

{
   float mu_max, mu_min, smaller_mu;

mu_max = LARGE(max);
mu_min = SMALL(min);
smaller_mu = mu_max;
if( mu_max > mu_min ) {smaller_mu = mu_min;}
return smaller_mu;
}
/*-----------------------------------------------------------*/
float RULE_7 (max,min)
int max,min;
{
   float mu_max, mu_min, smaller_mu;

mu_max = VERY_LARGE(max);
mu_min = SMALL(min);
smaller_mu = mu_max;
if( mu_max > mu_min ) {smaller_mu = mu_min;}
return smaller_mu;
}
/*-----------------------------------------------------------*/
float RULE_8 (max,min)
int max,min;
{
   float mu_max, mu_min, smaller_mu;
```

```
mu_max = LARGE(max);
mu_min = MEDIUM_SMALL(min);
smaller_mu = mu_max;
if( mu_max > mu_min ) {smaller_mu = mu_min;}
return smaller_mu;
}
/*------------------------------------------------------------*/
float RULE_9 (max,min)
int max,min;
{
   float mu_max, mu_min, smaller_mu;

mu_max = VERY_LARGE(max);
mu_min = MEDIUM_SMALL(min);
smaller_mu = mu_max;
if( mu_max > mu_min ) {smaller_mu = mu_min;}
return smaller_mu;
}
/*------------------------------------------------------------*/
float RULE_10 (max,min)
int max,min;
{
   float mu_max, mu_min, smaller_mu;

mu_max = VERY_LARGE(max);
mu_min = MEDIUM(min);
smaller_mu = mu_max;
if( mu_max > mu_min ) {smaller_mu = mu_min;}
return smaller_mu;
}
/*------------------------------------------------------------*/
float RULE_11 (max,min)
int max,min;
{
   float mu_max, mu_min, smaller_mu;

mu_max = MEDIUM(max);
mu_min = SMALL(min);
smaller_mu = mu_max;

if( mu_max > mu_min ) {smaller_mu = mu_min;}
return smaller_mu;
}
/*------------------------------------------------------------*/
float RULE_12 (max,min)
int max,min;
{
   float mu_max, mu_min, smaller_mu;

mu_max = MEDIUM_LARGE(max);
mu_min = MEDIUM_SMALL(min);
smaller_mu = mu_max;
if( mu_max > mu_min ) {smaller_mu = mu_min;}
return smaller_mu;
}
/*------------------------------------------------------------*/
float RULE_13 (max,min)
int max,min;
{
   float mu_max, mu_min, smaller_mu;

mu_max = LARGE(max);
mu_min = MEDIUM(min);
smaller_mu = mu_max;
if( mu_max > mu_min ) {smaller_mu = mu_min;}
return smaller_mu;
}
/*------------------
```

Appendix II

```
gface.c          Fri Sep 27 09:48:37 1991          1

/*---------------------------------------------------------
         gface.c
  ---------------------------------------------------------
  This program globally changes the color of the picture. It check to
  see if there are sufficiently large number of facial tones in the
  picture. The facial tones are detected by a neural network whose
  Inputs are normalized rmy and bmy values.
     If there is insufficient facial tone count, then the distribution
  of color into one of the 3 categories namely LOW, HIGH, or MEDIUM
  is done.
     Depending on the distribution of color in the picture on the
  rmy-bmy plane, corrections are applied to enhance color in the
  MEDIUM categories and decrease color in the other two cases.
  ---------------------------------------------------------*/ include <stdio.h>
include <math.h> define HEADER1_LENGTH 120
define HEADER_LENGTH 92
#define SEEK_SET 0
#define SEEK_CUR 1
define SEEK_END 2 define FILE_NAME_LENGTH 80 define RT_STANDARD 1
define RMT_EQUAL_RGB 1
#define MAXVAL 256
#define MAPLENGTH (3*MAXVAL)

struct HEADER1 {
    int pels_per_line;
    int lines_per_frame;
    int num_frames;
    int bits_per_pel;
    int type_flag;
    int len_header2;
    int not_used[16];
    char comments[80];
};

struct HEADER2 {
    int start_d;
    int npfrm;
    int nfrms;
    int nbp;
    int dcont;
    int nlfrm;
    int npl;
    int chmode;
    int sthz;
    int vlfrm;
    int vlrate;
    int vint1;
    int fint1;
    int frmf;
    int opt0;
    int opt1;
    int opt2;
    int opt3;
```

```
    char        comments1[32];
    char        comments2[32];
};

char fname[80], flt_name[80];

int frame_number;
int len_head2;
short int Y[490][740], X[490][740], Z[490][740], U[490][740];
int origin;
long frame_size, index;
long offset;
int len_head2;
int cnop, low_count, med_count, high_count, very_high_count;
float dnop, l_count, m_count, h_count;
float oup;
float scale;
float rw1,rw2,rw3,rw4,rw5,rw6,rw7,rw8,rw9;
float a1,a2,b1,b2,b3,b4,b5,b6,b7,b8,c1,c2,c3,c4,c5,c6;

float change,change1;
float lrmy,lbmy;
#include </popeye/p9/images/sti/standard.h>
/*-------------------------------------------------------*/
main ()
{
    struct HEADER1 *hd1rmy, *hd1bmy, *hd1lum, *get_dvs_header1();
    struct HEADER2 *hd2rmy, *hd2bmy, *hd2lum, *get_dvs_header2();
    FILE *fopen(), *infp1, *infp2, *infp3, *outfp1, *outfp2, *outfp3;
    int i;
    int N;

test ();
    getchar();
    query_input_filename ();

strcpy(filename, fname);
    strcat(filename, ".rmy");
    infp1 = fopen(filename,"r");

strcpy(filename, fname);
    strcat(filename, ".bmy");
    infp2 = fopen(filename,"r");

strcpy(filename, fname);
    strcat(filename, ".lmy");
    infp3 = fopen(filename,"r");

query_output_filename ();

printf(" Please enter the number of frames you wish to process:");
    scanf("%d",&N);

strcpy(filename, fname);
    strcat(filename, ".rmy");
    outfp1 = fopen(filename,"w");

strcpy(filename, fname);
    strcat(filename, ".bmy");
    outfp2 = fopen(filename,"w");

strcpy(filename, fname);
    strcat(filename, ".lum");
    outfp3 = fopen(filename,"w");
```

```
gface.c     Fri Sep 27 09:48:37 1991                                    2 hd1lum = get_dvs_header1(infp1);
    hd2lum = get_dvs_header2(infp1);

hd1bmy = get_dvs_header1(infp2);
    hd2bmy = get_dvs_header2(infp2);
    hd1rmy = get_dvs_header1(infp3);
    hd2rmy = get_dvs_header2(infp3);

hd1rmy->num_frames = 2*N;
    hd1bmy->num_frames = 2*N;
    hd1lum->num_frames = 2*N;

write_header_info into dvs_file (hd1rmy,hd2rmy,outfp1);
    write_header_info into dvs_file (hd1bmy,hd2bmy,outfp2);
    write_header_info into dvs_file (hd1lum,hd2lum,outfp3);

for(i=1; i<=N; i++)
    {
        frame_number = i;
        transfer_dvs_format_into_a_2darray (hd1lum,infp1);
        transfer_2darray_into_dvs_file (hd1lum,outfp3);
        transfer_from_X_to_Y (hd1lum);              /* lum is in Y[i][j] */ transfer_dvs_format_into_a_2darray (hd1bmy,infp2);
        transfer_2darray_into_dvs_file (hd1bmy,outfp2);
        transfer_from_X_to_Z (hd1bmy);              /* bmy is in Z[i][j] */ transfer_dvs_format_into_a_2darray (hd1rmy,infp3);
        transfer_2darray_into_dvs_file (hd1rmy,outfp1);
                                                    /* rmy is in X[i][j] */
        check_image_type (hd1rmy);
        change_image (hd1rmy);

/* write the output back into a file */
        transfer_2darray_into_dvs_file (hd1rmy,outfp1);
        transfer_2darray_into_dvs_file (hd1bmy,outfp2);

transfer_from_Z_to_X (hd1bmy);
        transfer_2darray_into_dvs_file (hd1bmy,outfp2);
        transfer_from_Y_to_X (hd1lum);
        transfer_2darray_into_dvs_file (hd1lum,outfp3);
    } fclose(infp1);
    fclose(infp2);
    fclose(infp3);

fclose(outfp1);
    fclose(outfp2);
    fclose(outfp3);
}
/*---------------------------------------------------------------*/
float HIGH (val)
float val;
{
    float mu;
    mu = 0.0;

if( (val > 0.25) && (val <= 0.5) ) { mu = 1.0; }
    if( (val < -0.25) && (val >= -0.5) ) { mu = 1.0; }
```

```
    return mu;
}
/*---------------------------------------------------------------*/
float MEDIUM (val)
float val;
{
    float mu;
    mu = 0.0;

if( (val > -0.25) && (val <= -0.025) ) { mu = 1.0; }
    if( (val < 0.25) && (val >= 0.025) ) { mu = 1.0; } return mu;
}
/*---------------------------------------------------------------*/
float LOW (val)
float val;
{
    float mu;
    mu = 0.0;

if( (val > 0) && (val <= 0.025) ) { mu = 1.0; }
    if( (val > -0.025) && (val <= 0) ) { mu = 1.0; } return mu;
}
/*---------------------------------------------------------------*/
float sigmoid (sum1,gain,threshold)
float sum1,gain,threshold;
{
    float oup;
    oup = 1*gain*(sum1 - threshold);
    if ( oup > 1.0 ) { oup = 1; }
    if ( oup < -1.0 ) { oup = -1; }
    return oup;
}
/*---------------------------------------------------------------*/
float sigmoid1 (sum1,gain,threshold)
float sum1,gain,threshold;
{
    float oup;
    oup = 1*gain*(sum1 - threshold);
    if ( oup > 1.0 ) { oup = 1; }
    if ( oup <0.0 ) { oup = 0; }
    return oup;
}
/*---------------------------------------------------------------*/
float pattern_matching (nrmy,nbmy)
float nrmy,nbmy;
{
    float h1,h2,h3,h4,h5;
    float sum1,nop;
    float w11,w21,w12,w22,w13,w23,w14,w24,w15,w25,w1,w2,w3,w4,w5;
    float theta1,theta2,theta3,theta4,theta5,theta0;

w11 = 1.0;       w21 = 0.0;
    w12 = 27.0;      w22 = 32.0;
    w13 = -16.0;     w23 = -17.0;
    w14 = 0.0;       w24 = -1.0;
    w15 = -3.0;      w25 = -4.0;
    theta1 = 5.0;  theta2 = -192.0;  theta3 = -238.0;  theta4 = -1.0;
``` gface.c          Fri Sep 27 09:48:37 1991          3

```
theta0 = 4.5; theta3 = -216.0;
w1 = 1.0; w2 = 1.0; w3 = 1.0; w4 = 1.0; w5 = 1.0;

sum1 = w11*nrmy + w21*nbmy;
h1 = sigmoid(sum1,100.0,theta1);

sum1 = w12*nrmy + w22*nbmy;
h2 = sigmoid(sum1,100.0,theta2);

sum1 = w13*nrmy + w23*nbmy;
h3 = sigmoid(sum1,100.0,theta3);

sum1 = w14*nrmy + w24*nbmy;
h4 = sigmoid(sum1,100.0,theta4);

sum1 = w15*nrmy + w25*nbmy;
h5 = sigmoid(sum1,100.0,theta5);

sum1 = w1*h1 + w2*h2 + w3*h3 + w4*h4 + w5*h5;
nop = sigmoid(sum1,1.0,theta0);

return nop;
}
/*-------------------------------------------------*/
float line_check (nrmy,nbmy)
    float nrmy,nbmy;
{
    float h1,h2,h3,h4,h5;
    float sum1,rop;
    float w11,w21,w12,w22,w13,w23,w14,w24,w15,w25,w1,w2,w3,w4,w5;
    float theta0,theta1,theta2,theta3,theta4,theta5,theta0;

w11 = 3.0;   w21 = -4.0;
    w12 = 3.0;   w22 = -4.0;
    w13 = 3.0;   w23 = -4.0;

theta1 = 4.0*19.0;  theta2 = 4.0*28.0;  theta3 = 4.0*42.0;

sum1 = w11*nrmy + w21*nbmy;
    h1 = sigmoid(sum1,100.0,theta1);

sum1 = w12*nrmy + w22*nbmy;
    h2 = sigmoid(sum1,100.0,theta2);

sum1 = w13*nrmy + w23*nbmy;
    h3 = sigmoid(sum1,100.0,theta3);

if( (h1 < 0) && (h2 < 0) && (h3 < 0) ) {low_count = low_count + 1;}
    if( (h1 > 0) && (h2 < 0) && (h3 < 0) ) {med_count = med_count + 1;}
    if( (h1 > 0) && (h2 > 0) && (h3 < 0) ) {high_count = high_count + 1;}
    if( (h1 > 0) && (h2 > 0) && (h3 > 0) ) {very_high_count = very_high_count + 1;}
}
/*-------------------------------------------------*/
rule_check (nrmy,nbmy)
    float nrmy,nbmy;
{
    float rop1,rop2,rop3,rop4,rop5,rop6,rop7,rop8,rop9;

nrmy = nrmy/256.0;
    nbmy = nbmy/256.0;

rop1 = LOW(nrmy); rop2 = LOW(nbmy);
    rop3 = MEDIUM(nrmy); rop4 = MEDIUM(nbmy);

if((rop1 > 0.5) && (rop2 > 0.5)) { l_count = l_count + 1; }
    if((rop1 > 0.5) && (rop4 > 0.5)) { m_count = m_count + 1; }
    if((rop3 > 0.5) && (rop2 > 0.5)) { m_count = m_count + 1; }
    if((rop3 > 0.5) && (rop4 > 0.5)) { m_count = m_count + 1; }
}
/*-------------------------------------------------*/
check_image_type (header1)
    struct HEADER1 *header1;
{
    float nrmy,nbmy,norm_factor;
    int i,j;
    float nop;

cnop = 0;
    dnop = 0;

l_count = 0;   h_count = 0;   m_count = 0;
    low_count = 0; med_count = 0; high_count = 0;

for (i=1; i<= header1->lines_per_frame; i++)
    {
        for (j=1; j<= header1->pels_per_line; j++)
        {
            nrmy = X[i][j] - 128;   nbmy = Z[i][j] - 128;

nop = pattern_matching(nrmy,nbmy);

if( nop > 0 )
            {
                cnop = cnop + 1;
                line_check (nrmy,nbmy);
            }
            if( nop <= 0 )
            {
                dnop = dnop + 1;
                rule_check(nrmy/1.2,nbmy/0.9);
            }
        }
    } printf("The facial tone detection count is %d \n",cnop);
    printf(" The low, medium, high and very_high counts are %d %d %d %d\n", low_count, med_count, high_count, very_high_count);

h_count = dnop - m_count - l_count ;

printf("The non_facial tone detection count is %d \n",dnop);
    printf(" The low, medium, and high counts are %d %d %d\n", l_count, m_count, h_count);
}
/*-------------------------------------------------*/
float compute_change (l_count,m_count,h_count)
float l_count,m_count,h_count;
{
    float h1,h2,h3,h4,h5;
    float sum1;
```

We claim:

1. A method for controlling the quality of a television picture comprising the steps of:

a) separating a video signal comprising said television picture into a luminance signal having a first range of luminance values and at least one color signal having a color quality parameter and a plurality of color values;

b) detecting for a first period of time, a first value of said first range of luminance values and a second value of said first range of luminance values;

c) deriving a first picture change signal by processing said first and second values in accordance with a plurality of preformulated rules;

d) detecting for said first period of time, the color distribution of said plurality of color values so as to determine a first color distribution value and a second color distribution value;

e) selecting either said first color distribution value or said second color distribution value as a second picture change signal, according to a first criteria;

f) altering said first range of luminance values in response to said first picture change signal; and g) altering said color quality parameter in response to said second picture change signal.

2. The method of claim 1 wherein said first color quality parameter is color saturation.

3. The method of claim 1 wherein said first color quality parameter is tint.

4. The method of claim 1 wherein said first picture change signal relates to the brightness of said television picture.

5. The method of claim 1 wherein said first picture change signal relates to the contrast of said television picture.

6. The method of claim 1 wherein said first color distribution value is the distribution of facial tones and the second color distribution value is the distribution of nonfacial tones.

7. The method of claim 6 wherein said first criteria is the percentage of facial tone distribution.

8. An apparatus for controlling the quality of a television picture comprising a plurality of fields, said apparatus comprising in combination:

a) means for separating a video signal comprising said television picture into a luminance signal having a first range of luminance values and at least one color signal having a color quality parameter and a plurality of color values;

b) first detecting means coupled to said separating means, for detecting for a first period of time, a first value of said first range of luminance values and a second value of said first range of luminance values;

c) means coupled to said first detecting means, for providing a first picture change signal corresponding to said first and second values in accordance with a plurality of preformulated rules;

d) second detecting means coupled to said separating means, for detecting for said first period of time, the color distribution of said plurality of color values so as to determine a first color distribution value and a second color distribution value;

e) means coupled to said second detecting means, for selecting either said first color distribution value or said second color distribution value as a second picture change signal, according to a first criteria;

f) means coupled to said providing means, for altering said first range of luminance values in response to said first picture change signal; and g) means coupled to said second detecting means, for altering said color quality parameter in response to said second picture change signal.

9. The apparatus of claim 8 wherein said first color quality parameter is color saturation.

10. The apparatus of claim 8 wherein said first color quality parameter is tint.

11. The apparatus of claim 8 wherein said first picture change signal relates to the brightness of said television picture.

12. The apparatus of claim 8 wherein said first picture change signal relates to the contrast of said television picture.

13. The apparatus of claim 8 wherein said first color distribution value is the distribution of facial tones and the second color distribution value is the distribution of non-facial tones.

14. The apparatus of claim 13 wherein said first criteria is the percentage of facial tone distribution.

15. The apparatus of claim 8 wherein said second detecting means comprises at least one neural network.

16. A method for controlling the quality of a television picture comprising a plurality of fields, said method comprising the steps of:

a) separating a video signal comprising said television picture into a luminance signal having a first range of luminance values and at least one color signal having a color quality parameter and a plurality of color values;

b) detecting for a first field, the color distribution of said plurality of color values so as to determine a first color distribution value and a second color distribution value;

c) selecting either said first color distribution value or said second color distribution value as a picture change signal, according to a first criteria;

d) altering said color quality parameter for a subsequent field in response to said picture change signal.

17. The method of claim 16 wherein said first color quality parameter is color saturation.

18. The method of claim 16 wherein said first color quality parameter is tint.

19. An apparatus for controlling the quality of a television picture comprising a plurality of fields, said apparatus comprising in combination:

a) means for separating a video signal comprising said television picture into a luminance signal having a first range of luminance values and at least one color signal having a color quality parameter and a plurality of color values;

b) detecting means coupled to said separating means, for detecting for said first field, the color distribution of said plurality of color values so as to determine a first color distribution value and a second color distribution value;

c) means coupled to said detecting means, for selecting either said first color distribution value or said second color distribution value as a picture change signal, according to a first criteria;

d) means coupled to said detecting means, for altering said color quality parameter for a subsequent field in response to said picture change signal.

20. The apparatus of claim 19 wherein said first color quality parameter is color saturation.

* * * * *